United States Patent

Allington et al.

[15] 3,667,056
[45] May 30, 1972

[54] SAMPLE, HOLD, AND SUBTRACT CIRCUIT

[72] Inventors: Robert W. Allington; Herbert C. Griess, both of Lincoln, Nebr.

[73] Assignee: Instrumentation Specialties Company, Lincoln, Nebr.

[22] Filed: Nov. 17, 1970

[21] Appl. No.: 90,249

[52] U.S. Cl. ............................... 328/151, 328/114, 307/229, 307/238
[51] Int. Cl. ................................................ H03k 17/16
[58] Field of Search .................. 328/151, 114; 307/238, 229

[56] References Cited

UNITED STATES PATENTS

| | | |
|---|---|---|
| 3,263,177 | 7/1966 | Durrett ................................. 328/151 |
| 3,207,998 | 9/1965 | Corney et al. .......................... 328/151 |
| 3,434,062 | 3/1969 | Cox ....................................... 328/114 |
| 3,430,227 | 2/1969 | Hillis ..................................... 328/151 |

Primary Examiner—Donald D. Forrer
Assistant Examiner—Harold A. Dixon
Attorney—Vincent L. Carney

[57] ABSTRACT

To correct the drifting baseline of a chromatographic signal, a sampling, holding, and subtracting circuit of a baseline correction apparatus samples the signals during clock pulses from a timing source and stores the values of the signals across a capacitor. When a slope detector in the baseline correction circuit senses that the slope of the signal starts to deviate from the baseline and form a peak, the sample, hold and subtract circuit stops sampling and storing new values and subtracts the last stored value from the signal.

11 Claims, 1 Drawing Figure

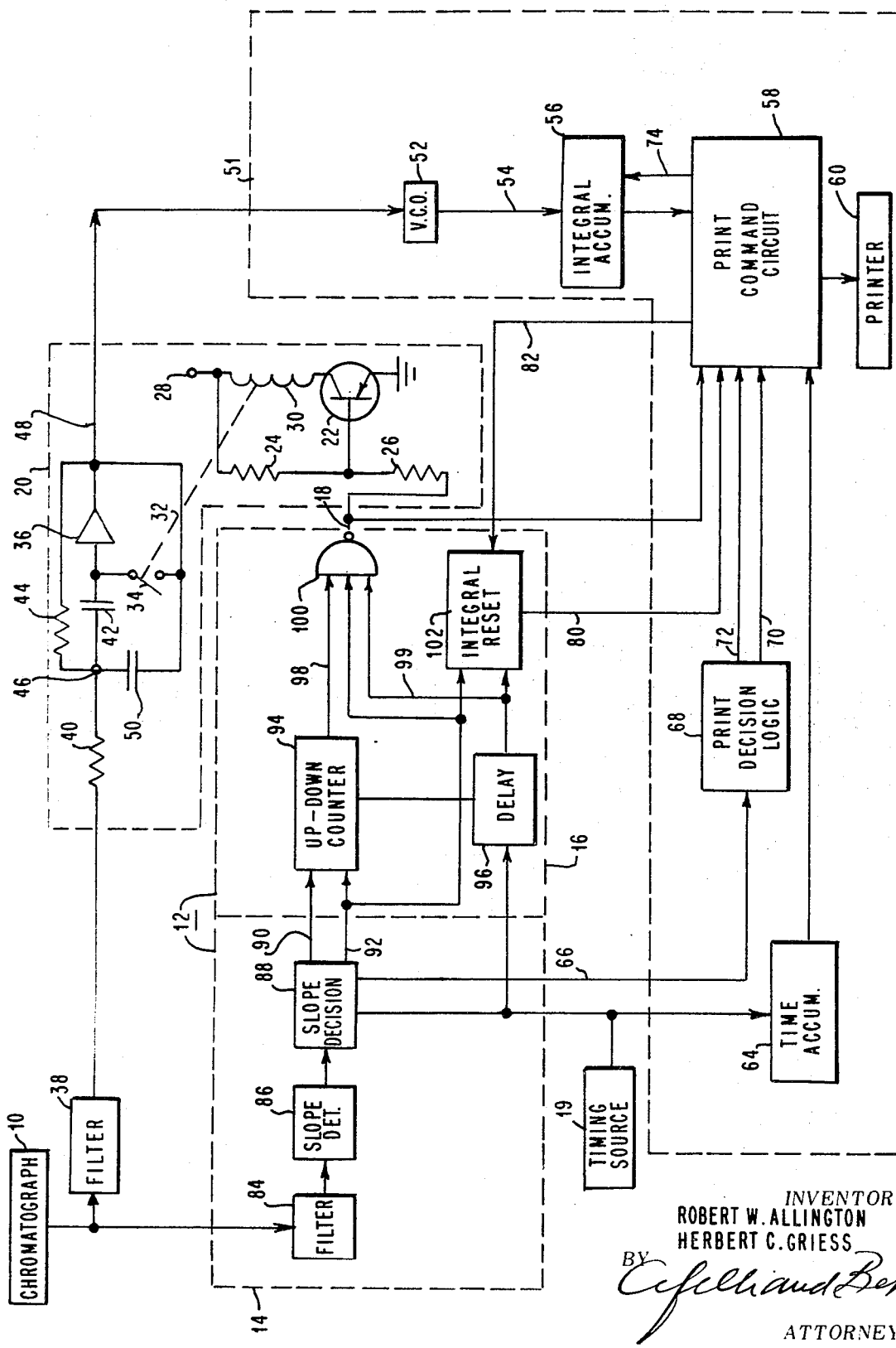

ps
3,667,056

SAMPLE, HOLD, AND SUBTRACT CIRCUIT

REFERENCE TO COPENDING APPLICATIONS

The following copending applications are referred to in this application. The content of these applications are hereby made a part of this application as if fully recited herein.

Application of Robert W. Allington, U.S. Ser. No. 90,252 titled "Apparatus for Determining and Characterizing the Slopes of Time-varying Signals," assigned to the same assignee of this application and filed concurrently herewith.

Application of Robert W. Allington and Herbert C. Griess, U.S. Ser. No. 90,247, titled "Apparatus for Providing Optimum Measurement of Varying Chromatographic Peak Shapes," assigned to the same assignee as this application, and filed concurrently herewith.

BACKGROUND OF THE INVENTION

This invention relates to apparatuses for correcting voltage-varying signals having drifting baselines and more particularly relates to sample, hold, and subtract circuits for use in such apparatuses and their methods of operation.

Signal correction is often necessary before processing signals such as chromatographic signals emerging from a chromatograph that tests the components of gases or liquids. Such signals usually follow a baseline interrupted by significant peaks that offer information concerning the components of the fluid being tested. In some cases the heights of the peaks are of interest, in others the areas bounded by the baseline and the peaks. In still others the time of the peak is of interest.

In all these cases the measurements are degraded by extraneous effects upon the signal such as noise or baseline drift. Errors are introduced by these extraneous effects. This is especially true when the signal is to be integrated by an automatic integrator or handled by other automatic equipment such as an analog to digital converter, peak height recorder, or other apparatus.

One type of baseline corrector includes a slope detector a sample, hold and subtract circuit, and a logic circuit connecting the slope detector to the sample, hold, and subtract circuit. The sample, hold and subtract circuit samples and stores the baseline potential. Later the sample, hold, and subtract circuit subtracts the baseline potential from the signal, leaving only the signal for further processing.

Prior art sample, hold, and subtract circuits store the baseline at the same time as the onset of the chromatographic peak. Since any apparatus used to sense the onset of a chromatographic peak can have only finite speed and sensitivity, the peak will already have started at the time that the baseline potential has been sensed. If the baseline value is stored to correct the chromatographic signal level at this time, too high a baseline level will be stored because the signal will have already risen slightly at the onset of the peak. If the baseline value is stored much earlier, an incorrect baseline may be stored because the baseline may drift between storage and onset of the peak.

SUMMARY OF THE INVENTION

According to one feature of this invention, the sample, hold, and subtract circuit samples and stores the baseline potential just before the signal starts and subtracts this stored potential from the combined baseline and signal.

According to another feature of this invention, the sample, hold and subtract circuit periodically samples and stores the baseline potential. When the slope detector senses the start of a signal, it inhibits the sampling of the baseline potential. Since the last potential stored by the sample, hold and subtract circuit occurred one clock pulse before the start of the signal, it is not increased by the signal.

According to still another feature of the invention, the storage means includes a capacitor.

According to yet another feature, the subtract means include an operational amplifier, a capacitor connected in series with the input to the operational amplifier, an input resistor connected in series with the capacitor, and a second resistor bridging the capacitor and the operational amplifier.

According to yet another feature of the invention the sampling means include switch means connected from the input to the output of the operational amplifier for shunting it, and control means responsive to the detecting means for closing the switch means in response to pulses during the no-slope voltages.

By virtue of these features the signal is corrected during a baseline by the last sampled baseline voltage. During a peak it is corrected by the baseline voltage at some discreet interval before the peak. This prevents the peak voltage from disturbing the correction. The correction voltage that corrects the peak is the baseline voltage at the last sample of the sampling circuit before the onset of the peak. This assures a correction voltage that corresponds to the drift immediately prior to the peak being analyzed. Because the system operates at discrete time intervals it is simple to synchronize with a digital system.

These and other features of the invention are pointed out in the claims. Many objects and advantages of the invention will become obvious from the following detailed description when read in light of the accompanying drawing.

BRIEF DESCRIPTION OF THE DRAWING

The drawing illustrates a schematic block diagram of a chromatographic analyzing system embodying features of the invention.

DESCRIPTION OF PREFERRED EMBODIMENT:

In FIG. 1, a chromatograph 10 applies a voltage-varying signal, composed of a baseline interrupted by peaks at successive time spaces, to a slope indicator system 12. The signal may drift along its baseline and peaks. The system 12 is composed of a slope detector section 14 and a slope logic section 16. The slope detector section is described in detail in the beforementioned copending application of Robert W. Allington. The slope logic section 16 and its interconnection with the slope detector section 14 are described in the beforementioned copending application of Robert W. Allington and Herbert C. Griess.

A potential or pulse on the output line 18 from the slope logic section 16 indicates that a peak on the signal from the chromatograph 10 has passed and it also indicates that enough time has passed since the last minimum slope was exceeded by the peak, to be sure that the signal is a baseline. More specifically, when the peak is broad, the pulse on line 18 indicates that the total time, since the start of the last peak, during which the peak had at least some minimum slope has been equaled by the total time, since the start of the peak, during which the peak has had less than a minimum slope. Where the section 16 notes that the peak exhibits a sharp apex, then the potential or pulse on output line 18 specifically indicates that the total time during which the signal has a slope less than minimum, equals the time during which the signal has at least a minimum slope, but only since the apex of the last peak. In both cases the existence of an output pulse on line 18 indicates that the signal voltage is indeed a baseline.

The pulse at line 18 takes place only when there is the simultaneous existence of three conditions. These are: zero input signal slope, a sufficient time has passed since the preceding slope has dropped to zero, and that a clock pulse from a timing source 19 is in progress. The pulses on line 18 continue until the slope detector section 14 indicates the onset of a chromatographic peak, when the slope is no longer zero.

The significant potential on line 18, indicating a baseline, is a negative going pulse. The latter actuates a sample, hold, and subtract circuit 20. More specifically, the negative pulse on line 18 turns on a PNP-transistor 22 whose base is biased by two resistors 24 and 26. The collector current resulting from the negative pulse and flowing to a terminal 28 energizes a coil 30 of a relay 32.

As used herein, the terms negative pulse or negative going pulse refer to any pulse whose value becomes more negative than an initial value and then returns to the initial value. The pulse need at no time have an actual negative value. According to the embodiment herein, a negative pulse starts at a value of plus 5 volts, drops to zero volts and returns to plus 5 volts.

The energized relay coil 30 closes a contact 34 of the relay 32. As a result, a direct connection closes between the input and output of an amplifier 36 in inverting operational amplifier configuration. Because in an operational amplifier such as shown, the input to the amplifier is a substantially zero potential, the output is also a zero potential.

The amplifier 36 receives the possibly drifting signal input from chromatograph 10 through a low pass filter 38. An input resistor 40 passes the filtered signal to the input of the amplifier 36 through a storage capacitor 42. With the contact 34 closed, the filtered signal is the value to which a baseline has departed from its desired zero value. A feedback resistor 44 has a value equal to the input resistor 40. The resistor 44 connects from a junction 46 with the resistor 40 to the output of the amplifier 36. The output of amplifier 36, with the contact 34 closed, is a zero potential. Thus the voltage across both resistors 40 and 44 is substantially the value of the baseline voltage drift, if any. The voltage at the junction 46 is one-half the drifted baseline voltage. With contact 34 closed, half the baseline voltage is thus stored across capacitor 42.

As long as the baseline remains zero, contact 34 keeps closing with each succeeding pulse from source 19 and keeps storing the latest value of baseline drift. When the baseline correction pulse no longer exists on line 18, contact 34 will not close. When the signal voltage of the chromatograph 10 rises at the start of a new peak, the contact remains open because there is no negative pulse on line 18. The chromatographic voltage rise (above the stored value corresponding to the baseline) appears in inverted form at a lead 48. This is so because, by operational amplifier action, the input to amplifier 36 must stay at zero volts. Therefore the junction of resistors 40 and 44 must stay at one-half the baseline voltage. This is subtracted from the signal voltage and added to the output voltage. The circuit effectively subtracts the baseline voltage, stored at the last pulse, from the input signal and presents the difference as a corrected output signal at the lead 48. A capacitor 50 provides noise filtering in conjunction with the resistor 40.

The voltage on lead 48 is a corrected version of the voltage at the chromatograph 10. Two corrections have been applied, namely noise filtering by filter 38 and capacitor 50, and more importantly, correction for baseline drift. The voltage stored in capacitor 42 is one-half the baseline voltage, and effectively twice this stored value is subtracted from the signal input voltage. When the signal input voltage rises above the stored baseline, the voltage on lead 48 drops below zero volts.

The pulses on line 18 continue while the slope is zero, but not after a new peak has started. Thus the last potential stored across the capacitor 42 by closing of contact 34 is the baseline during the pulse from source 19 immediately preceding the next peak rise. The baseline and the next peak is thus adjusted in circuit 20 for the baseline level that existed during the previous clock pulse. That pulse is the last to occur before the peak rise.

An analyzing system may now utilize the corrected signal appearing on line 48. Such an analyzing system may be of a conventional type or may be more unusual. An example of a system utilizing the corrected signal is shown by system 51 to furnish a clearer picture of the overall utility of the apparatus illustrated.

In system 51 the baseline-corrected signal voltage is applied by lead 48 to a voltage controlled oscillator 52. The voltage controlled oscillator 52 produces an output frequency on a lead 54 which is proportional to the voltage on lead 48. Successive cycles of this output frequency are counted or accumulated in an integral accumulator 56. The stored count in the integral accumulator 56 at any one time is proportional to the baseline-corrected integral of the input signal. A print command circuit 58, which includes a logic network, commands a printer to print the number of cycles accumulated during each peak in the integral accumulator 56.

The timing source 19 produces timing signals or pulses that are accumulated in a time accumulator 64. The count stored in the time accumulator is equal to the amount of time elapsed since the beginning of the chromatographic run. Slope information is provided on a lead 66 from the slope detector section 14 of the slope indicator 12.

The information is used to control a print decision logic circuit 68 in such a way as to produce a "time print" output on a lead 70 at the summit of a chromatographic peak and to produce an "integral print" signal on lead 72 at the onset of a positive slope, indicating a new chromatographic peak has started and that the preceding peak must be immediately printed if it has not already been printed. An "integral print" signal is also supplied to printer command circuit 58 by line 18. The signal on line 18 can be used to indicate the end or the return to baseline at the end of a chromatographic peak. This causes an integral print at such a time. The "time print" signal on lead 70 causes the command circuit 58 to store the time accumulated in time accumulator 64. However, the print of the time does not immediately occur since it is desirable to print this peak summit time along with the integral value at the end of the peak. An "integral print" signal on lead 72 or 18 causes the command circuit 58 to take the stored count from integral accumulator 56 along with its internally stored peak summit time, and cause them to be printed by the digital printer 60. Simultaneously, a lead 74 causes the reset of the integral accumulator 56 so that a fresh integral for the next chromatographic peak can be accumulated. Obviously, a paper tape punch or other device could be used instead of a digital printer 60.

The slope logic section 16 of the slope indicator system 12 also generates an inhibit signal on a lead 80. This signal stops the printing if the time during which a peak has a non-zero slope is so short as to suggest that the peak is a noise peak. Peaks with non-zero slopes that last less than two timing pulses either during slope ascent or descent are rejected. A reset lead 82 from the print command circuit 58 resets the integral reject circuit so it is capable of rejecting another spurious peak.

The system 12 is described in the two beforementioned copending applications. Generally, its operation is as follows. A low pass filter 84 applies the uncorrected signal from the chromatograph 10 to a cyclically operated slope detector 86. At each pulse from the timing source 19, the slope detector 86 generates a positive pulse in response to a positive signal slope exceeding a close to zero minimum, and a negative voltage pulse in response to a signal slope more negative than a given close to zero negative minimum. A slope decision circuit 88 produces a signal on a lead 90 indicating that there exists a slope that is either a positive slope that is more positive than the positive minimum or a negative slope more negative than the negative minimum. On a lead 92 the decision circuit 88 produces a signal indicating that there is no slope, that is, no slope more positive than the positive minimum and no slope more negative than the negative minimum. An up-down counter 94 counts upwards each time a clock pulse is received through a delay 96 from the timing source 19, when the slope of the input signal, as indicated on the lead 90, is not zero. The counter 94 counts down with each pulse when the lead 92 indicates there is no slope, i.e., the slope is substantially equal to zero and between the two minima.

Lead 92 from the slope decision circuit, lead 98 from the up-down counter, and lead 99 from the delay 96 all enter sample gate 100. Sample gate 100 is a NAND gate. It produces a negative output at lead 18 only when lead 92 indicates a zero input signal slope, lead 98 indicates a zero condition of the up-down counter and lead 99 indicates the presence of a clock pulse.

An integral reject circuit 102 provides for the rejection of spurious signal peaks, so that they are not classified as legitimate peaks. Such peaks may be due to electrical noise, and it is desirable not to print their integrals. Lead 92 which indicates when the slope of the input signal is non-zero, passes to integral reject circuit 102. Timing source 19 provides timing signals to integral reject circuit 102 through delay 96. Integral reject circuit 102 counts these clock pulses when lead 92 indicates that the signal input has a non-zero slope. If the signal input has a non-zero slope for a long enough period of time, an inhibit signal on lead 80, which up until this time has been inhibiting the printer 60 by providing an inhibiting signal to print command circuit 58, is removed. After removal of this inhibiting signal, a printing can be made of the integral, as described earlier. Lead 82 resets the counter in the integral reject circuit 102 after a printing operation. If desired, lead 82 can be connected in such a way that this reset is made even if the actual printing had been inhibited by a signal on lead 80.

The invention furnishes simple, reliable means for correcting for baseline drift with an accurate correction signal.

The beforementioned copending application of Robert W. Allington and Herbert C. Griess describes the slope decision circuit 88 in more detail. The slope decision portion of that application includes a portion composed of logic elements and described as a logic circuit.

While embodiments of the invention have been described in detail, it will be obvious to those skilled in the art that the invention may be embodied otherwise without departing from its spirit and scope.

What is claimed is:

1. A method of correcting a circuit input signal that occurs at an unpredicted time for baseline drift, comprising the steps of:
    obtaining a baseline signal representing a baseline potential that occurs immediately before a circuit input signal that occurs at the unpredicted time; and
    operating on the circuit input signal and said baseline signal to produce an output signal representing the difference between the baseline potential and the combined circuit input signal and baseline potential.

2. A method according to claim 1 in which the step of obtaining a baseline signal comprises the steps of:
    repetitively sampling said baseline potential when no circuit input signal is present;
    deriving a baseline signal by multiplying the baseline potential by a factor for each sample, whereby said baseline signal represents said baseline potential;
    successively storing the derived baseline signal for each sample; and
    stopping the repetitive sampling as soon as a circuit input signal appears, whereby the last baseline signal stored represents the baseline potential occurring immediately before the circuit input signal.

3. A method according to claim 2 in which the step operating on the circuit input signal comprises the steps of:
    obtaining a further circuit input signal representing the circuit input signal by multiplying the circuit input signal by a factor; and
    subtracting the baseline signal from the further circuit input signal to obtain an output signal representing the circuit input signal corrected for baseline drift.

4. In a baseline correction circuit for removing a baseline potential from circuit input signals that occur repetitively with the baseline, the baseline correction circuit having a clock pulse source and identification means for providing a first identification signal indicating the presence of said circuit input signal and a second identification signal indicating the presence of only said baseline potential, a sample, hold and subtract circuit, comprising:
    storage means for storing a baseline signal representing said baseline potential; and
    sampling means for applying the baseline signal to the storage means each time both a clock signal and said second identification signal are provided and for inhibiting the application of the baseline signal to the storage means when said first identification signal is provided, whereby said baseline signal is stored during the clock pulse occuring immediately before said first identification signal;
    said sampling means including subtracting means for operating on the circuit input signal and the baseline signal stored immediately before the first identification signal to provide a difference signal representing the difference between said combined circuit input signal and the baseline signal and said baseline potential during said first identification signal.

5. A sample, hold, and subtract circuit according to claim 4 in which said sampling means comprises gate means, electrically connected to said clock pulse source and said identification means, for connecting said baseline potential to said storage means upon concurrently receiving a clock pulse and said second identification signal.

6. A sample, hold, and subtract circuit according to claim 5 in which:
    said gate means comprises a gate having first and second inputs and one output and a switch electrically connected to the output of said gate;
    said first input being electrically connected to said source of clock pulses and said second input being electrically connected to said identification means;
    said storage means including a capacitor.

7. A sample, hold, and subtract circuit according to claim 4 in which said sampling means comprises operator means for multiplying said baseline potential by a factor to derive said baseline signal, for holding said baseline signal on said storage means, for multiplying said circuit input signal by said factor to obtain a further circuit input signal, and for subtracting said baseline signal from said further circuit input signal.

8. A sample, hold, and subtract circuit according to claim 7 in which said operator means comprises:
    an operational amplifier;
    a first impedance having one end electrically connected to the output of said operational amplifier and having the other end electrically connected to one end of said storage means, the other end of said storage means being electrically connected to the input of said operational amplifier;
    a second impedance having one end electrically connected to said first impedance and having its other end electrically connected to receive said circuit input signals;
    said operational amplifier having a high input impedance, whereby said baseline signal is held on said storage means.

9. A sample, hold, and subtract circuit having a circuit input terminal for receiving circuit input signals and a circuit output terminal for providing a circuit output signal that is a function of the circuit input signal at a first time subtracted from the circuit input signal at a second time, comprising:
    a first impedance having a first impedance first end and a first impedance second end;
    said first impedance first end being electrically connected to said circuit input terminal;
    a second impedance having a second impedance first end and a second impedance second end;
    said second impedance second end being electrically connected to said circuit output terminal;
    storage means, having a first storage terminal electrically connected to said second impedance first end and having a second storage terminal, for storing a function of said circuit input signal at said first time;
    said first impedance second end being electrically connected to said second impedance; and
    operator means, electrically connecting said second impedance second end and said second storage terminal, for holding the potential at said second storage terminal and second impedance second end at a reference potential during said first time, whereby a function of said circuit input signal is impressed on said storage means, and for holding the potential at said second storage terminal at said reference potential while permitting the potential at said second impedance second end to fluctuate at said second time, whereby said circuit output terminal receives an output signal that is said function of the circuit input signal at said first time subtracted from the circuit input signal at said second time.

10. A sample, hold, and subtract circuit according to claim 9 in which said operator means includes a means for holding the potential at said second storage terminal at said reference potential while permitting the potential at said second impedance second end to fluctuate between said first time and said second time, whereby said function of said circuit input signal at said first time is stored on said storage means at least between said first time and second time.

11. A sample, hold, and subtract circuit according to claim 9 in which said operator means includes an operational amplifier having an operational amplifier input terminal electrically connected to said second storage terminal and an operational amplifier output terminal electrically connected to said second second end;

said storage means comprising a capacitor and said first and second impedances comprising resistors.

* * * * *